US008354608B2

(12) United States Patent
Dave et al.

(10) Patent No.: US 8,354,608 B2
(45) Date of Patent: Jan. 15, 2013

(54) METHODS FOR CONTROL OF A FUSION WELDING PROCESS BY MAINTAINING A CONTROLLED WELD POOL VOLUME

(75) Inventors: Vivek R Dave, Los Alamos, NM (US); Mark J Cola, Santa Fe, NM (US)

(73) Assignee: B6 Sigma, Inc., Santa Fe, NM (US)

( * ) Notice: Subject to any disclaimer, the term of this patent is extended or adjusted under 35 U.S.C. 154(b) by 306 days.

(21) Appl. No.: 12/780,610

(22) Filed: May 14, 2010

(65) Prior Publication Data

US 2010/0288734 A1 Nov. 18, 2010

Related U.S. Application Data

(60) Provisional application No. 61/178,473, filed on May 14, 2009.

(51) Int. Cl.
*B23K 9/18* (2006.01)
(52) U.S. Cl. .................. 219/73.2; 219/74; 219/121.61; 219/137 WM; 700/300
(58) Field of Classification Search .............. 219/73.2, 219/73, 74, 121.64, 121.14, 136, 137 R, 137 WM; 700/300
See application file for complete search history.

(56) References Cited

U.S. PATENT DOCUMENTS

| 4,767,911 | A | * | 8/1988 | Maram et al. | 219/130.01 |
|---|---|---|---|---|---|
| 5,061,841 | A | * | 10/1991 | Richardson | 219/130.01 |
| 5,532,454 | A | * | 7/1996 | Kuhnen | 219/137 R |
| 5,552,575 | A | * | 9/1996 | Doumanidis | 219/124.34 |
| 5,731,567 | A | * | 3/1998 | Kato et al. | 219/137 R |
| 2007/0156371 | A1 | * | 7/2007 | Battiste | 702/136 |

\* cited by examiner

*Primary Examiner* — Kimberly Rizkallah
*Assistant Examiner* — Duy T Nguyen
(74) *Attorney, Agent, or Firm* — V. Gerald Grafe

(57) ABSTRACT

A new method of process control for fusion welding maintains a controlled weld pool size or volume, for example in some applications a substantially constant weld pool size or volume. The invention comprises a method of linking machine and process variables to the weld pool size or volume in real time, thereby enabling constant weld pool volume control. The invention further comprises a method of using thermal inverse models to rapidly process real-time data and enable models-based control of welding processes so as to implement constant weld pool volume control.

25 Claims, 4 Drawing Sheets

METHODS FOR CONTROL OF A FUSION WELDING PROCESS BY MAINTAINING A CONTROLLED WELD POOL VOLUME

RELATED APPLICATIONS

This invention is claims priority to U.S. provisional 61/178,473, filed May 14, 2009, which is incorporated herein by reference.

FIELD OF THE INVENTION

This invention relates to welding processes and, in particular, to a method and apparatus for constant weld pool volume control of a welding process.

BACKGROUND OF THE INVENTION

Welding processes are routinely used for joining pieces of metal in the manufacturing and construction industries, including the aerospace, automotive, and electronics industries. These welding processes typically use electric arcs or energy beams as heat sources. However, welding processes are still unable to be precisely controlled to reliably produce quality welds or weld profiles. In many applications, a higher level of process control is required and, as such, feedback from the process can be vital to properly regulate welding conditions so that the desired process control can be achieved.

Currently, such process control is largely accomplished through control of so-called primary process variables. As an example, for an arc welding process, primary process variables can include arc current, arc voltage, physical arc length, arc pulse duration and pulse characteristics (either in the voltage or current waveforms), workpiece travel speed or rotational speed (e.g., for round parts), wire feed rate or rate of material addition, preheat of the part, and gas flow and type of welding gas. As another example, for energy beam based processes, primary process variables can include beam power and focal characteristics for the energy beam, workpiece travel speed or rotational speed (for round parts), wire feed rate or rate of material addition, preheat of the part, continuous versus pulsed mode (including pulse rate and shape), gas flow and type of welding gas for laser beam processes, and beam Lissajous patterns formed by deflection coils and scanning frequency of these Lissajous patterns for electron beam processes.

As shown schematically in FIG. 1, the control of these primary welding machine variables provides only indirect control over the welding process, including weld pool, the weld pool volume and shape, the heat flow in the part, and the metallurgical properties of the final component. Occasionally, there can be some feedback from the welding process itself, as shown schematically in FIG. 2. However, in general, there is not at present a direct method for sensing the volume of the weld pool and an associated control scheme that directly regulates the volume of the weld pool.

There have been several previous efforts in thermal sensing and control of welding processes over the years. These previous efforts are described in the references below, each of which is incorporated herein by reference.

Z. Bingul, G. E. Cook, and A. M. Strauss, "The application of fuzzy logic to spatial thermal control in fusion welding," *Industry Applications, IEEE Transactions* 36(6), 1523 (2000) considers the problem of sensing and controlling torch position in a pulsed gas metal arc welding (P-GMAW) process. To deal with the nonlinear time-varying process with its inherent stochastic disturbances associated with metal transfer, the theory of fuzzy sets was used as a general framework to interpret the uncertain arc signals and provide logic for control. A fuzzy logic controller weld joint tracking system was implemented and tested with pulsed gas metal arc welds under a variety of conditions.

Fredrik Sikström et al., "Modelling and simulation for feedback control of welding," *Proc. of the 18th IASTED Int. Conf: modelling and simulation*, Montreal, Canada, 131 (2007) describes a promising strategy that makes use of modelling and simulation to support design of real time controller in automated welding. A finite element method was used for thermal modelling of gas tungsten arc welding on a simplified test object. Data for model calibration and validation was acquired through thermal imaging during weld experiments on test objects of SS316 alloy. An optimization scheme for inverse modeling was employed in the calibration of the distributed weld process model. Frequency weighted model reduction and parametric system identification were applied and evaluated to obtain a low-order model of the single-input, single-output dynamics between a simulated weld source (actuator) and a simulated sensor signal. This low order model was then used for controller design and the closed-loop performance was evaluated by simulation of the weld process model.

G. Korizis and C. Doumanidis, "Scan welding: Thermal modeling and control of material processing," *J. Manufacturing Science and Engineering* 121(3), 417 (1999) provides a thermal analysis of scan welding, as a redesign of classical joining methods, employing computer technology to ensure the composite morphologic, material and mechanical integrity of the joint. Real-time control of the welding temperature field was obtained using a proper dynamic heat input distribution on the weld surface. This distribution was implemented in scan welding with a single torch that swept the joint surface by a controlled, reciprocating motion, and adjusting power by in-process feedback of infrared temperature measurements. An off-line numerical simulation of the thermal field in scan welding was established, as well as a linearized multivariable model with real-time parameter identification. An adaptive thermal control scheme was implemented and validated both computationally and experimentally on a robotic gas-tungsten arc welding setup. The resulting productivity and quality features of scan welding were comparatively analyzed in terms of material structure and properties of the joint.

Fabrice Bardin et al., "Process control of laser conduction welding by thermal imaging measurement with a color camera," *Applied Optics* 44(32), 6841 (2005) considers conduction welding as an alternative to keyhole welding. Compared with keyhole welding, conduction welding is an intrinsically stable process because vaporization phenomena are minimal. However, as with keyhole welding, an on-line process-monitoring system is advantageous for quality assurance to maintain the required penetration depth which, in conduction welding, is more sensitive to changes in heat sinking. The maximum penetration is obtained when the surface temperature is just below the boiling point, and so it is desired to maintain the temperature at this level. Therefore, a two-color optical system was developed for real-time temperature profile measurement of the conduction weld pool. The key feature of the system was the use of a complementary metal-oxide semiconductor standard color camera leading to a simplified low-cost optical setup. The real-time temperature measurement and control performance of the system was described when a defocused beam from a high power Nd:YAG laser was used on 5-mm-thick stainless steel workpieces.

W. Lu et al., "Nonlinear interval model control of quasi-keyhole arc welding process," *Automatica* 40(5), 805 (2004) addresses the development of a nonlinear model based interval control system for a quasi-keyhole arc welding process, a novel arc welding process which has advantages over laser welding and conventional arc welding processes. The structure of the nonlinear model chosen was based on an analysis of the quasi-keyhole process to be controlled. Because of variations in the manufacturing conditions, the parameters of the nonlinear model were uncertain but bounded by fixed intervals if the range of the manufacturing conditions was specified. To determine the intervals, extreme operating conditions/parameters (manufacturing conditions) were used to conduct experiments. Each experiment gave a set of model parameters and the interval for each parameter was given by the minimum and maximum among the values obtained from different experiments. Closed-loop control experiments verified the effectiveness of the developed system as a robust control which required no re-adjustment and could function properly when fluctuations/variations in manufacturing conditions, and thus the process dynamics, change, vary, or fluctuate.

Hua Zhang et al., "The real-time measurement of welding temperature field and closed-loop control of isotherm width," *Science in China Series E: Technological Sciences* 42(2), 129 (1999) describes the real-time measurement of a welding temperature field by a colorimetric method. With the data acquired from it a closed-loop control system of the parameters of the temperature field were developed and tested. Experimental results proved that the system had high measurement speed (time of a field within 0.5 s) and good dynamic response quality. Weld penetration could be controlled satisfactorily under unstable welding condition.

Doumanidis, "Scan welding method and apparatus," U.S. Pat. No. 5,552,575, describes a single weld head, or torch, that is time-shared to implement any specified distributed heat input by scanning along a weld centerline and a region surrounding the centerline while adjusting the torch intensity accordingly on its path. The scan welding torch reciprocates rapidly on dynamically scheduled trajectories while power to the torch can be modulated in real-time to provide a regulated heat input distribution in the weld region and on the weld centerline. The method can generate a smooth and uniform temperature field, and deposit the full length of the weld bead simultaneously at a controlled solidification rate. As a result, grain interlacing on the bead interface in conjunction with a regulated material microstructure can yield improved tensile joint strength.

However, none of the present processes are able to provide the control of the size and shape of the weld pool that is desired for some applications.

SUMMARY OF THE INVENTION

None of the present processes use thermal sensors in conjunction with a thermal inverse model and augmented by weld pool frequency sensing for the specific purpose of controlling the size and shape of the weld pool. Some embodiments of the present invention provide a welding process based on sensing and direct control of the weld pool volume. Some embodiments of the present invention provide a method that combines a thermal sensor or sensors with a thermal inverse model that then allows direct inference and calculation of the weld pool volume, thereby allowing a control system to be implemented that directly controls the weld pool volume. An additional and augmenting method of sensing comprises sensing of the natural frequency of the weld pool, which in turn allows an independent estimate of the weld pool volume and, when combined with a thermal prediction, allows more accurate volume estimation and thus better process control of weld pool volume.

Some embodiments of the present invention provide a method of process control for any fusion welding process comprising constant weld pool volume control. Some embodiments of the present invention provide for monitoring and control of welding processes using a thermal inverse modelling approach coupled with multi-channel thermal sensing with the objective of maintaining a constant weld pool size or volume. Some embodiments of the present invention use thermal sensors combined with a real time or near real-time thermal model to determine the weld pool volume, a reduced-order thermal model coupled with an optimization method to solve a thermal inverse problem in near-real time, and the ability to implement models-based control using the thermal model and real-time sensing.

Some embodiments of the present invention provide algorithms and computational approaches that accomplish the following in near-real time: 1) monitor the thermal condition of the weld process (in real time) using any of a variety of sensors, such as a high speed non-contact pyrometer; 2) take the limited thermal data from a single point in a thermal field or several points in the thermal field and process it with a reduced order thermal model; and 3) solve an inverse problem in near-real time using the thermal model to infer the effective welding heat source energy distribution characteristics, including predicting the thermal field at multiple subregions of the weld region as well as the heat affected zone, predicting the cooling rate of the weld at the various weld liquid/solid interfaces, predicting the size and volume of the weld pool, and predicting what change in heat source distribution characteristics will be required to maintain a constant weld pool volume. The predictions can be compared to the thermal measurement and the welding machine tool settings can be changed accordingly to control the weld pool volume.

Embodiments of the present invention can be used with all arc welding processes (e.g., GMAW—gas metal arc welding; GTAW—gas tungsten arc welding; FCAW—flux cored arc welding; SAW—submerged arc welding; HWGTAW—hot wire gas tungsten arc welding; P-GMAW—pulsed gas metal arc welding; P-GTAW pulsed gas tungsten arc welding; Orbital tube welding—a specific type of GTAW; SMAW—submerged arc welding; VP-PAW—Variable polarity plasma arc welding; VP-GTAW—variable polarity tungsten arc welding; VP-GMAW—variable polarity gas metal arc welding.), beam welding processes (e.g., LBW, EBW), and material deposition and build-up processes involving any type of arc welding and any type of beam welding as the heat source.

BRIEF DESCRIPTION OF THE DRAWINGS

The accompanying drawings, which are incorporated in and form part of the specification, illustrate the present invention and, together with the description, describe the invention. In the drawings, like elements are referred to by like numbers.

DETAILED DESCRIPTION OF THE INVENTION

Figure 1:
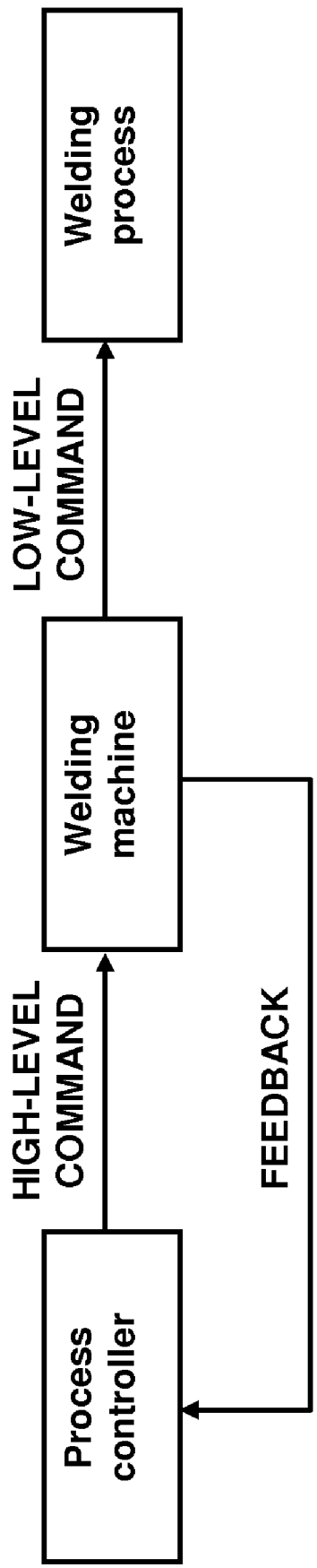
FIG. 1 is a schematic illustration of a process for indirect welding control over the weld pool, the weld pool size and shape, the heat flow in the part, and the metallurgical properties of the final component.
Figure 2:
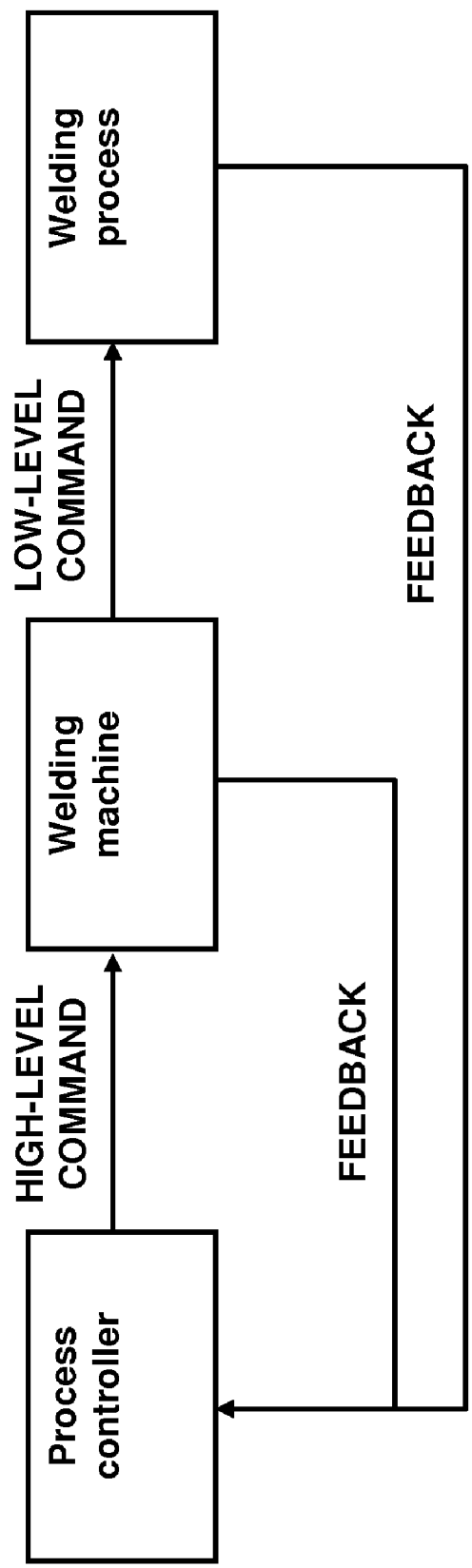
FIG. 2 is a schematic illustration of a process for welding control that enables feedback from the welding process itself.

Embodiments of the present invention provide a method of process control for fusion welding in general, such as control of a fusion welding process by maintaining a controlled (e.g., substantially constant) weld pool size or volume. Embodiments of the invention provide a method of linking machine and process variables to the weld pool size or volume in real time or near real time and thereby enable controlled weld pool volume control. Embodiments of the present invention can further comprise a method of using thermal inverse models to rapidly process real-time data and enable models-based control of welding processes so as to implement controlled weld pool volume control. In the description below, the example of a constant weld pool volume will be used for simplicity of illustration, although the invention can also be used to control weld pool volume to conform to other desired volume characteristics such as linear change, or change based on portion of a weld or materials involved.

A method for control of a fusion welding process by maintaining a constant weld pool volume comprises generating a weld pool using a welding machine tool having a plurality of process variable settings, making a thermal measurement of the weld pool using a thermal sensor, solving a thermal inverse model to predict the thermal response of the weld pool to the plurality of process variable settings, comparing the predicted thermal response of the weld pool to the thermal measurement of the weld pool, and changing at least one process variable setting of the welding machine tool in response to the comparison of the predicted thermal response and the thermal measurement of the weld pool.

The thermal inverse model can be implemented within the context of a reduced order thermal model running forwards in time together with an optimization method that changes parameters in the reduced order thermal model systematically until the reduced order thermal model predictions match a set of observed thermal profiles from the welding process. A variety of analytical techniques can be used to implement the reduced order thermal model, including an analytical model based on Green's functions, lookup tables that incorporate the results of higher fidelity thermal analyses and linear or nonlinear interpolation, a finite difference model, and an Artificial Neural Network (ANN). The optimization method can be a genetic or evolutionary algorithm, a nonlinear gradient method, can utilize ANNs, or a combination of the preceding.

Embodiments of the present invention can be applied to different welding process types. A method according to the present of constant weld pool volume control can be applied to all arc welding processes, including gas metal arc welding (GMAW), gas tungsten arc welding (GTAW), flux cored arc welding (FCAW), submerged arc welding (SAW), hot wire gas tungsten arc welding (HWGTAW), pulsed gas metal arc welding (P-GMAW), and orbital tube welding (a specific type of GTAW). A method according to the present can be applied to all energy beam welding processes, including laser beam welding (LBW) and electron beam welding (EBW). A method according to the present can also be applied to deposition or build-up processes, including GTAW with wire feed, GMAW, LBW with wire feed or powder feed, and EBW with wire feed.

The invention can use different types of sensing, data collection, and computing platforms. A method according to the present invention of constant weld pool volume control can use single or multiple non-contact temperature sensors, such as pyrometers. The method can use single or multiple contact temperature sensors, such as thermocouples. The single or multiple sensors, contact or non-contact, can be processed within a general purpose data processing apparatus, such as a personal computer (PC) based control system, and/or a dedicated processing platform, such as a digital signal processor (DSP) or a field programmable gate array (FPGA) based control system. The single or multiple sensors, contact or non-contact, can be wireless and the thermal field data can be collected wirelessly using either a PC-based system or a dedicated computing platform such as a DSP or FPGA.

A method according to the present can use various types of process control to generate control signals that regulate process variables to change the heat source distribution of the welding source and to thereby change the actual weld pool volume based on what the thermal inverse model predicts as the new target value. A method according to the present of constant weld pool volume control can use a thermal inverse model that generates a series of control signals that regulate arc current, arc voltage, or a combination thereof. This applies to all arc welding processes as well as all arc welding based deposition processes. Similarly, the thermal inverse model can generate control signals that regulate the work piece travel speed, the wire feed, or the rate of material addition to the same effect. Similarly, the thermal inverse model can generate control signals that regulate beam energy, beam focal characteristics, or some combination of both. Similarly, the thermal inverse model can generate control signals that regulate work piece travel speed or the wire feed or the rate of material addition, or some combination of both. The thermal inverse model can be combined with direct or indirect measurements of weld pool frequency so as to better estimate the actual weld pool volume, and thereby be better able to implement the control methods described above. Further, the temperature and weld pool frequency can be used as a mixed-mode, multi-sensor feedback control scheme to better implement the control methods described above.

Figure 3:
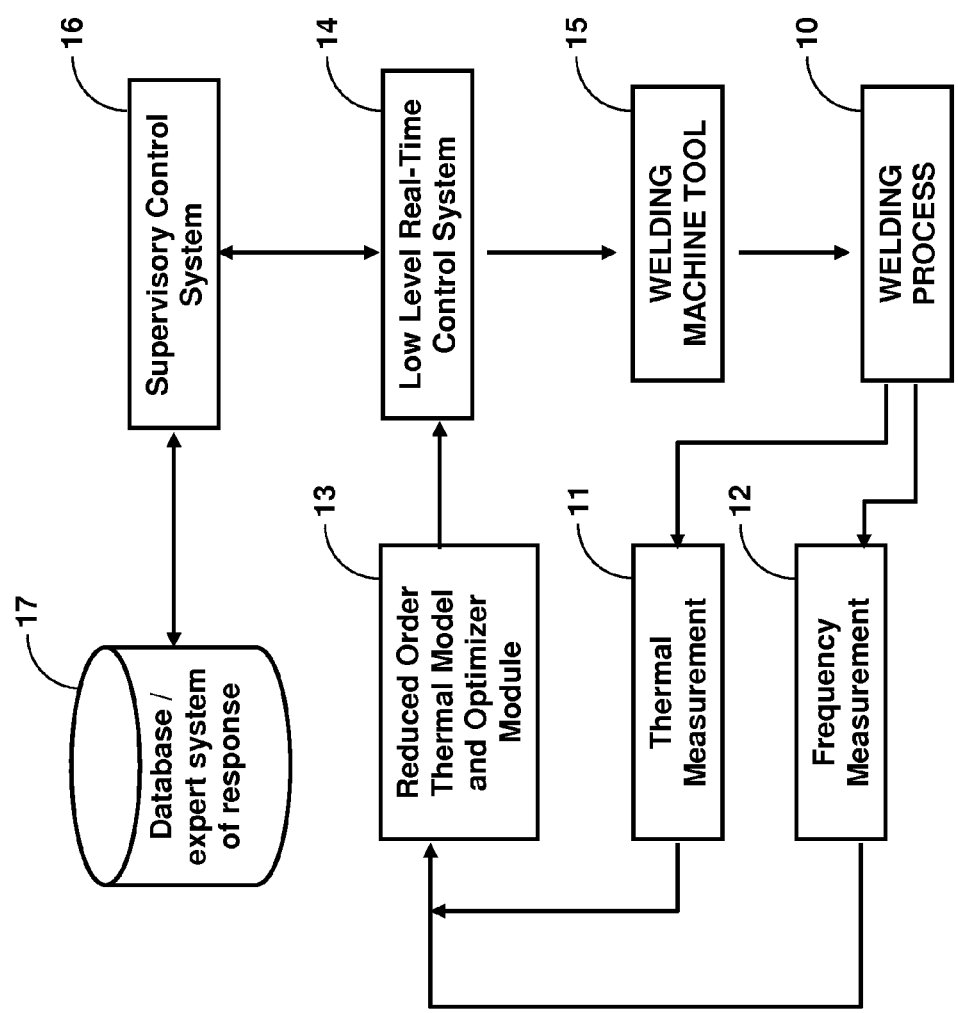
FIG. 3 is a schematic illustration of a sensing, modeling, and supervisory control method according to the present invention.

FIG. 3 schematically illustrates an exemplary embodiment of the present invention comprising a sensing, modeling, and supervisory control system for near-real time control of a welding process 10. The invention can comprise the steps described below.

A real-time thermal measurement 11 can be made using any variety of contact or non-contact measurement methods, such as infrared cameras, pyrometers, or thermocouples. The measurement method can be fast enough in terms of its response time to be consistent with the desired update loop of the controller 14.

The real-time thermal measurement 11 can be augmented by a frequency measurement 12 of the weld pool fundamental or higher order oscillation frequencies. The relationship between the frequency and the weld pool volume can be expressed:

$$t_{n-1} = \frac{\sqrt{\frac{3\pi\rho V}{\gamma}}}{\sqrt{(n(n-1)(n+2))}} \sec$$

where ρ is the fluid density, γ is the surface tension, V is the weld pool volume, and t is the oscillation period. A full discussion of weld process control based on measurement of weld pool oscillation frequency can be found in D. A. Hartman, *Modal Analysis of GTA Weld Pools for Penetration Control*, Ph.D. Dissertation, Electrical Engineering, Vanderbilt University, 1999, incorporated herein by reference.

Figure 4:
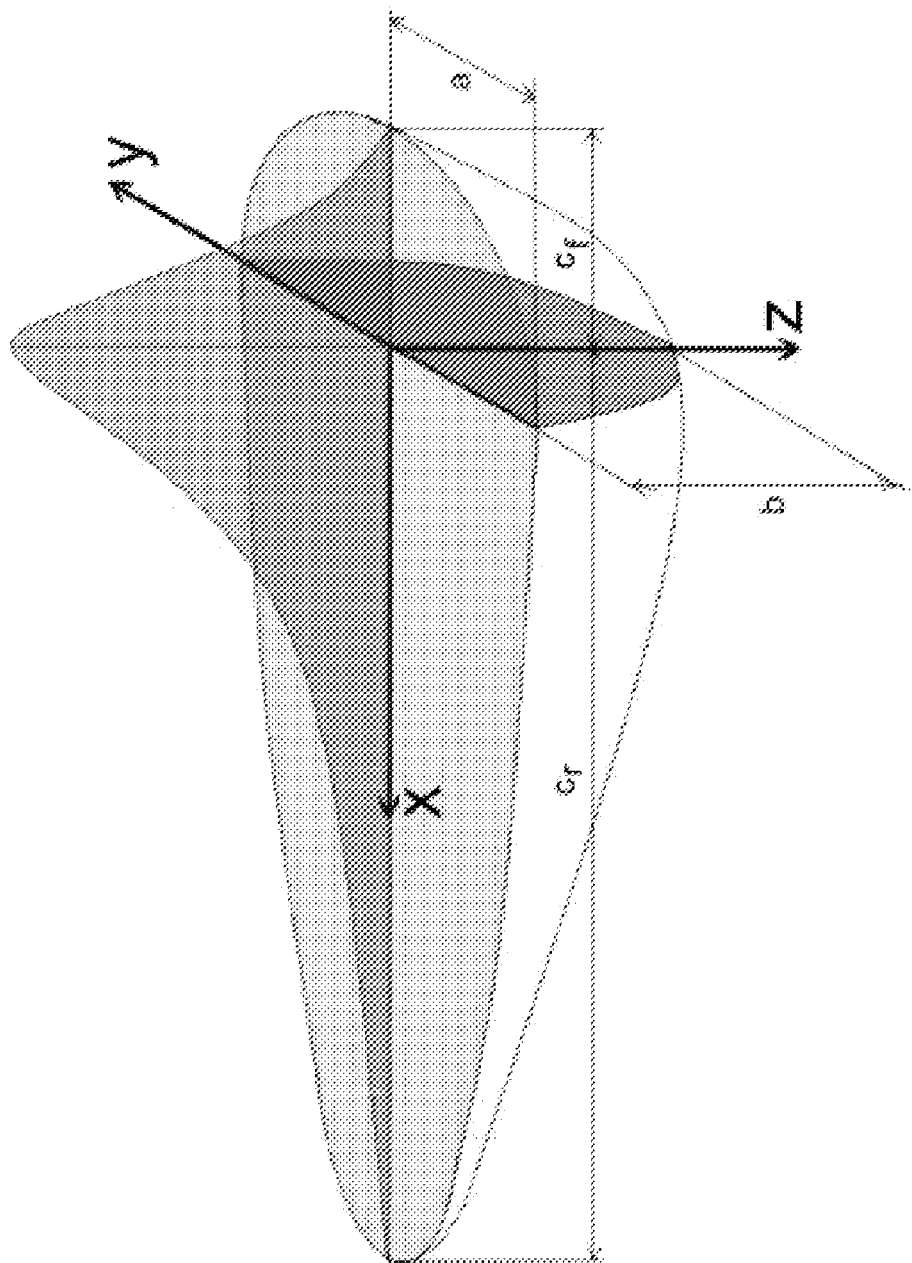
FIG. 4 is an illustration of weld pool showing parameters used in a reduced order thermal model.

Based on one or more such thermal measurements, the weld pool volume can be directly estimated and controlled as follows:

a. A reduced order thermal model 13 for the process is invoked.

b. The welding conditions in terms of welding machine tool "knob settings" are transferred to this model, i.e. current, voltage, travel speed, beam power, spot size, etc.

c. The thermal model is used to solve an inverse problem by running the reduced order thermal model forwards in time, but with an optimizer around this model that systematically varies parameters within the reduced order model. Examples of such parameters include:

i. Geometric distribution parameters that describe the three-dimensional distribution of heat due to the heat source, in $W/cm^3$, or in the case of a purely surface heat source, $W/cm^2$, ii. Energy absorption parameters that relate coupling of heat source energy to work piece, and iii. Beam focal parameters and welding cathode spot size parameters, An example of such parameters is shown in FIG. 4. Heat source distribution parameters a, b, $c_f$ and $c_r$ in this example are described in J. Goldak et al., "Thermal Stress Analysis Near the Weld Pool," *Mathematical Modeling of Weld Phenomena* 3, Ed. H. Cerjak, The Institute of Metals, pp. 543-570, 1997, incorporated herein by reference.

d. The optimizer module can have a fitness function that evaluates the quality of parametric choices and the fitness can be defined by comparing the measured thermal response to the predicted thermal response at given locations. The optimization method runs the reduced order thermal model and iterates on parameter sets until this fitness is within a pre-determined tolerance.

e. Using the same reduced order thermal model, the volume of the weld pool can be estimated by calculating the melt position of the melt isotherms in various planes, and fitting the weld pool to an assumed geometric body of revolution, which can be a combination of ellipsoids, paraboloids, etc., or can be defined by the locus of points resulting from the revolution of an arbitrary 2-D spline.

f. The predicted weld pool volume can then be further checked by comparing to the predicted fundamental oscillation frequency for that volume. This multi-sensor, multi-physics approach can provide additional certainty and accuracy.

g. As local welding conditions change, the volume of the weld pool will change and will drift away from the desired setpoint. Sources of such process variability include:

i. Variations in heat sinking due to variations in fixturing, ii. Variations in shielding gas, iii. Variations in surface properties that change energy coupling—especially for laser processes, iv. Fluctuations in the power of the heat source caused by power supply variations, v. Heat sinking changes caused by changes in the geometry of the part or the deposit being created, vi. Heat balance variability due to changes in wire feed, powder feed, or other material addition, vii. Local changes in the volume of the weld pool due to fluid mechanical effects driven by minor element variations in the base metal or the material being added to the weld, viii. Variations in the motion system that controls the work piece location and the travel speed of the heat source and/or the work, and ix. Other environmental factors that appear as "unmodeled dynamics" and therefore must be compensated for using an active control system.

h. When the weld pool volume varies from its desired setpoint, this can be detected by the thermal sensors, the weld pool frequency sensors, or combinations thereof. The thermal sensors can detect the volume change because as the melt isotherm location moves, all other isotherms move accordingly as viewed from a quasi-static reference frame attached to the heat source. The frequency sensor can directly detect the variation in weld pool volume on account of a frequency shift.

i. Once a shift is detected, the real-time controller 14 can have an internal logic table that analyzes the nature, sign and magnitude of the change. Based on pre-determined rules that can be determined by a distillation of multiple modelling runs or an expert system or otherwise generated based on experimental data, the controller 14 can decide which machine variable will be the best choice for adjustment so that the weld pool volume will return to its target value. These so-called "response vectors" can define a desired control strategy for a given change in weld pool characteristics.

j. The controller 14 can then make changes to the process variables welding machine tool 15.

k. New measurements can be made with the sensing system and steps above can be used to recalculate the weld pool volume, and the process continues indefinitely as long as the welding process 10 is in progress.

A supervisory controller 16 can also ensure that the chosen response vector produced the desired effect—otherwise it will seek an alternative vector, update the response vector database 17, or both. Updating the response vector database can allow the controller 14 to "learn" the process as it encounters more instances and examples of anomalous behaviour.

The present invention has been described in connection with various example embodiments. It will be understood that the above description is merely illustrative of the applications of the principles of the present invention, the scope of which is to be determined by the claims viewed in light of the specification. Other variants and modifications of the invention will be apparent to those of skill in the art.

What is claimed is:

1. A method for control of a fusion welding process by maintaining a controlled weld pool volume, comprising:

(a) generating a weld pool using a welding machine tool having a plurality of process variable settings, (b) making a thermal measurement of a weld pool using a thermal sensor, (c) using a thermal inverse model to predict the thermal response of the weld pool to the plurality of process variable settings, wherein the thermal inverse model comprises a reduced order thermal model that runs forwards in time together with an optimization method that changes parameters in the reduced order thermal model until the reduced order thermal model predictions match a set of observed thermal profiles from the welding process;

(d) comparing the predicted thermal response of the weld pool to the thermal measurement of the weld pool, and (e) changing at least one process variable setting of the welding machine tool in response to the comparison of the predicted thermal response and the thermal measurement of the weld pool.

2. The method of claim 1, wherein steps (a) to (e) are performed in real time.

3. The method of claim 1, wherein the controlled weld pool volume is a constant weld pool volume control.

4. The method of claim 1, wherein the reduced order thermal model comprises an analytical model based on Green's functions.

5. The method of claim 1, wherein the reduced order thermal model is based on lookup tables that incorporate the results of high fidelity thermal analyses and interpolation.

6. The method of claim 1, wherein the reduced order thermal model comprises a finite difference model.

7. The method of claim 1, wherein the reduced order thermal model comprises an Artificial Neural Network.

8. The method of claim 1, wherein the optimization method comprises a genetic algorithm, an evolutionary algorithm, or a combination thereon.

9. The method of claim 1, wherein the optimization method comprises a nonlinear gradient method.

10. The method of claim 1, wherein the optimization method comprises an Artificial Neural Network.

11. The method of claim 1, wherein the fusion welding process comprises an arc welding process, comprising gas metal arc welding, gas tungsten arc welding, flux cored arc welding, submerged arc welding, hot wire gas tungsten arc welding, pulsed gas metal arc welding, or orbital tube welding.

12. The method of claim 1, wherein the fusion welding process comprises an energy beam welding process, comprising a continuous wave laser beam welding (LBW); a pulsed continuous wave laser beam welding (LBW); a continuous wave electron beam welding (EBW); or a pulsed wave electron beam welding.

13. The method of claim 1, wherein the fusion welding process comprises a deposition process or a build-up process.

14. The method of claim 1, wherein the fusion welding process comprises at least one of GTAW, VP-GTAW, P-GTAW with wire feed; GMAW, VP-GMAW, P-GMAW; LBW with wire feed; LBW with powder feed; EBW with wire feed.

15. The method of claim 1, wherein the thermal sensor comprises at least one non-contact temperature sensor comprising a pyrometer.

16. The method of claim 1, wherein the thermal sensor comprises at least one contact temperature sensor comprising a thermocouple.

17. The method of claim 1, wherein steps c and d are performed using at least one of: a digital signal processor (DSP), or a field programmable gate array (FPGA).

18. The method of claim 1, wherein steps c and d are performed by a data processing system, and wherein the thermal sensor comprises at least one sensor that communicates wirelessly to the data processing system.

19. The method of claim 11, wherein step (e) comprises regulating arc current, arc voltage, or a combination thereof.

20. The method of claim 13, wherein step (e) comprises regulating arc current, arc voltage, or a combination thereof.

21. The method of claim 11, wherein step (e) comprises regulating work piece travel speed, wire feed rate, rate of material addition, or a combination of any of the preceding.

22. The method of claim 13, wherein step (e) comprises regulating work piece travel speed, wire feed rate, rate of material addition, or a combination of any of the preceding.

23. The method of claim 12, wherein step (e) comprises regulating beam energy, beam focal characteristics, or a combination thereof.

24. The method of claim 12, wherein step (e) comprises regulating work piece travel speed, wire feed rate, rate of material addition, or a combination of any of the preceding.

25. The method of claim 1, further comprising measuring the weld pool frequency, and wherein step e is further responsive to the measured weld pool frequency.

* * * * *